Feb. 1, 1938.  W. FLEURY  2,107,070
SHAFT COUPLING
Filed Sept. 18, 1936

INVENTOR
Werner Fleury
BY
Redding, Greeley & O'Shea
ATTORNEYS

Patented Feb. 1, 1938

2,107,070

UNITED STATES PATENT OFFICE 2,107,070

SHAFT COUPLING

Werner Fleury, Arbon, Switzerland, assignor to Societe Anonyme Adolphe Saurer, Arbon, Switzerland, a corporation of Switzerland Application September 18, 1936, Serial No. 101,357
In Germany May 9, 1936

2 Claims. (Cl. 64—25)

In the operation of internal combustion engines, in which the fuel is injected into the combustion chamber of the engine, and which are required to have a wide range of speed variation, as in the case of Diesel engines in automotive use, it is desirable, in order to assure smooth operation, that the instant of beginning injection of the fuel should be advanced or retarded in accordance with the increase or decrease of the speed of operation. Attempts have been made heretofore to provide means whereby the injection of the fuel can be given a lead or a lag as determined by the variation in speed of operation of the engine, but thus far, so far as known, the mechanism devised for the purpose has been complicated, unwieldy and requiring constant supervision to maintain certainty in operation. These objections have been overcome by the present invention in which a servo-piston which is movable longitudinally under the control of a centrifugal governor and, being also capable of rotation, is coupled to a driving gear of the injection pump, is in such operative relation with the cylinder of the servo-piston, which rotates with a shaft of the engine, that through the relative longitudinal movement of the piston and cylinder a relative lead or lag in the rotation of the piston and therefore of the driving gear of the injection pump, with respect to the rotation of the cylinder and its driving shaft, and a lead or lag of the speed of rotation of the driving gear of the injection pump is effected. The improved mechanism is compact in design, takes up little space and is very reliable in operation and as well is at all times thoroughly lubricated by the pressure feed oil which, under the control of the centrifugal governor, effects the displacement of the servo-piston.

The invention will be more fully explained hereinafter with reference to the accompanying drawing in which it is illustrated, and in which.

Figure 1:
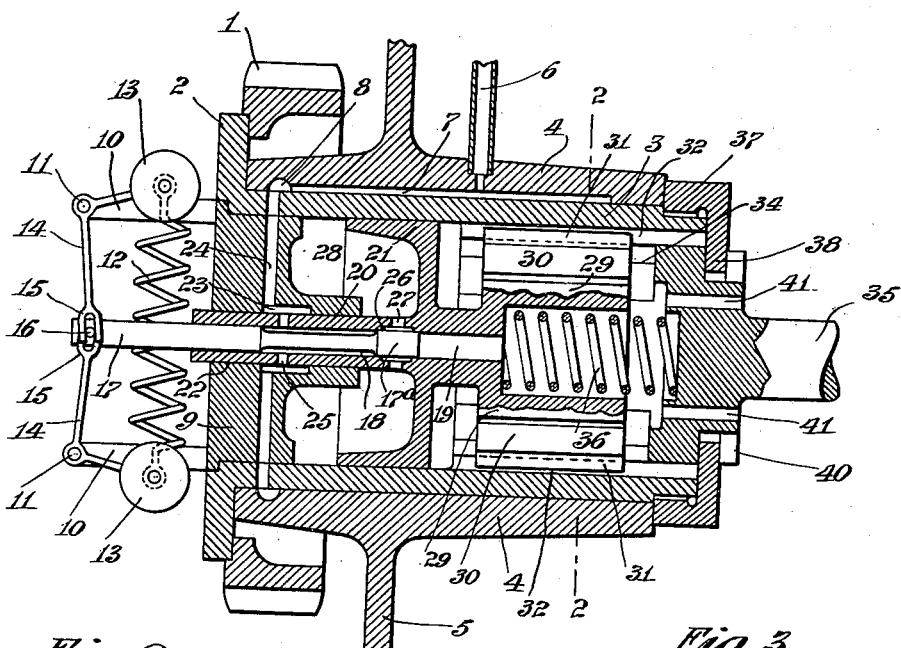
Figure 1 is a view in longitudinal section of a mechanism which embodies the invention.
Figure 2:
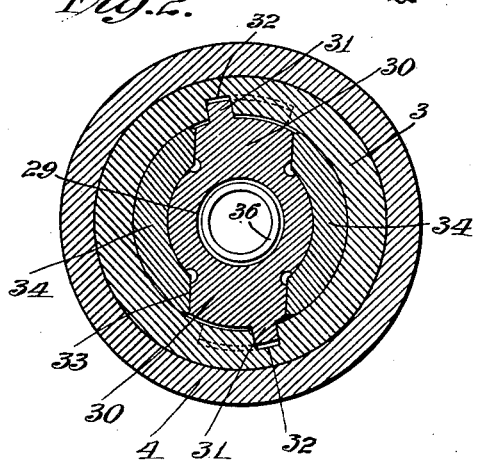
Figure 2 is a view in transverse section on the plane indicated by the broken line 2—2 of Figure 1.
Figure 3:
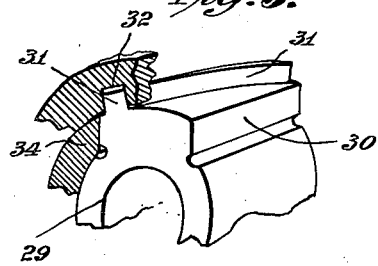
Figure 3 is a detail view in elevation of the device by which the interconnection between the servo-piston rod and the servo-cylinder is effected.

In Figure 1 there is shown at 1 a gear from which is driven the injection pump. The latter may be of any usual or suitable construction and need not be shown herein. The gear 1 is shown as secured to the flange 2 of the servo-cylinder 3 which is mounted for rotation in a bearing sleeve 4 which may form part of the engine housing 5. A fluid, preferably lubricating oil, is supplied under pressure from a suitable source to the interior of the sleeve 4 by an oil feed pipe 6. It is delivered to a longitudinal channel 7 formed in the inner surface of the sleeve 4 and thence to an annular groove 8, formed in the inner surface of the sleeve 4 near one end. The left hand end of the chamber within the sleeve 4 is closed by a closure head 9 which is provided on its outer face with brackets 10 in the outer ends of which are pivotally mounted, as at 11, the bell crank levers 14 which support on their horizontal arms centrifugal weights 13 and have the ends of their other arms forked, as at 15, to engage a transverse pin 16 of a control rod 17, the two centrifugal weights 13 being connected by a spring 12 as usual. It will be understood that the centrifugal governor thus described rotates with the driving gear 1 of the injection pump and that as the speed increases the centrifugal weights fly outward and the control rod 17 is moved to the right, while as the speed of rotation of the pump decreases the centrifugal weights move toward the axis of revolution and the control rod 17 moves to the left.

The control rod 17 moves longitudinally in the bore 19 of the hollow servo-piston rod 20, on which is mounted the servo-piston 21 adapted for movement within the servo-cylinder 3. The control rod 17 is reduced in diameter for a portion of its length to form a recess 18, its end 17ª having a close sliding fit in the bore 19 of the piston rod 20 forming a sliding control valve. The hollow piston rod 20, which is supported in a bearing 22 in the closure head 9, has its recess 18 at all times overlapping and therefore in communication with radial ports 25 in the tubular piston rod, such ports being also in communication through the elongated channels 23 with the radial channels 24 and therefore through the annular channel 8 and the longitudinal channel 7 of the sleeve 4, in communication with the oil inlet 6 from the oil pressure pump. The hollow piston rod 20 is also provided, as at 27, with radial ports which are in communication externally with the cylinder space 28 and internally with elongated channels 26 so that as the control rod 17 is moved to the left, the cylinder space 28 will be placed in communication with the bore 19 of the hollow piston rod to the right of the sliding valve 17ª, or, as the sliding valve 17ª is moved to the right, the cylinder space 28 will be placed in communication with the recess 18 and so, through the channels 23, the ports 25 and the channels 24, with the annular channel 8 and the longitudinal channel 9 and the oil inlet pipe 6.

The rod 20 of the servo-piston 21 is formed at the other side of the servo-piston 21 with an enlarged sleeve-like displacement member 29 which is formed with longitudinal radial bosses 30 in the form of sectors of a cylinder each of which is formed on its outer face with right angled, sharply pitched, spirally disposed threads 31 which engage corresponding sharply pitched, spirally arranged grooves 32 formed in the inner surface of the servo-cylinder 3. The engine shaft 35 by which the injection pump is actuated through the mechanism described and through the gear 1, is forked at its end, the forked members 34 embracing the enlarged sleeve-like member 29 of the servo-piston rod 20 and engaging the radial bosses 30 thereof so that the piston rod is rotated with the shaft 35, but with capacity for relative longitudinal displacement. So also the servo-cylinder 3 is rotated with the shaft 35 but with a relative lead or drag as determined by the relative longitudinal displacement of the piston and cylinder.

Within the chamber of the enlargement 29 there is placed a reaction spring 36 which bears at one end against a shoulder of the piston rod 20 and at the other end against the end of the driving shaft 35. The servo-cylinder 3 is itself held without capacity for longitudinal displacement within the bearing sleeve 4 by a cap nut 37 and the driving shaft 35 is held without capacity for longitudinal displacement by engagement of the cap nut with the shoulder 38 and the closure disc 40. Longitudinal channels 41 are provided in the hub of the shaft 35 for the discharge of used pressure oil.

As will be understood the centrifugal weights 13 of the governor assume, for every speed of rotation of the governor and of the gear 1, a certain definite position in which the centrifugal weights and the spring 12 are in equilibrium. For every speed of rotation the control valve 17ª, 18 therefore also assumes a definite position. In the position of the parts shown in Figure 1 the servo-piston has assumed a position corresponding to the position of the control valve 17, 17ª, 18 in which the cylinder space 28 is closed from communication and the lubricating oil or other fluid therein being in equilibrium with the tension of the spring 36 the servo-piston 21 remains at rest in that position. If then the speed of rotation of the governor is increased the centrifugal weights 13 fly outward and the control valve 17, 17ª, 18 is shifted to the right. Thereby the cylinder space 28 is placed in communication, through the channels 26, 27 with the recess 18 and, through the channels 25, 23, 24, 8, and 7, with the pressure oil line 6 of the oil pump. The oil pressure against the servo-piston 21 is thereby increased and the piston is moved toward the right against the pressure of the spring 36. The relative longitudinal movement of the piston 21 with respect to the cylinder 3 and the consequent relative longitudinal movement of the threads 31 in the grooves of the cylinder 3 causes a relative rotary displacement of the cylinder 3 and the shaft 35 and a consequent lead of the shaft 35 in relation to the gear 1 and an advance in the time of fuel injection The movement of the piston toward the right continues until the communication between the channels 26 and 18 is interrupted, when the servo-piston again assumes, with reference to the control valve 17, the position shown in Figure 1.

When the speed of rotation of the engine decreases the control valve 17 is shifted to the left in Figure 1, the cylinder space 28 is placed in communication with the bore 19 of the piston rod through the channels 26 and 27 and the pressure oil in the cylinder space 28 can then escape through the channels 41. The oil pressure being thus released the spring 36 shifts the piston 21 to the left and thereby, through the connections described above, the cylinder 3 and the engine shaft 5 are displaced in a rotary sense and a lag in relative rotation as between the shaft 35 and the gear 1 is occasioned, such lag being continued until the piston 21 again resumes its normal position with reference to the control valve 17, as shown in Figure 1. The servo-piston 21 therefore follows every movement of the centrifugal weights of the governor effecting a relative rotary displacement as between the engine shaft 35 and the gear 1 with a consequent and corresponding lead or lag, in point of time, of the injection of fuel oil into the engine cylinder.

It will be noted that the servo-piston, the reactance spring 36 and the regulating devices 29, 31, 32, 34, 35 are built into the same structure with the pump gear 1, the end closure 9 of the cylinder 3 serving as a carrier for the centrifugal governor 12, 13, the rod 17 of which serves as a control valve. The improved mechanism has therefore a very small space requirement, presents a minimum number of working joints and is at all times well lubricated by the employment of lubricating oil as the pressure fluid which acts upon the servo-piston.

I claim as my invention:

1. In a mechanism for changing the phase relationship between a driven shaft and a driving gear, the combination of a driven shaft, a driving gear, a servo-cylinder rotatable with the gear and spirally grooved internally, a servo-piston, a displacement member rotatable and movable longitudinally with the servo-piston and spirally threaded to engage the grooves of the servo-cylinder, means to supply fluid under pressure to the cylinder space to move the piston in one direction, a reactance spring acting in opposition to the fluid pressure, a centrifugal governor, means actuated by the governor to control the movement of pressure fluid to and from the cylinder space, and means whereby the servo-piston is coupled to the driven shaft to be rotated thereby with freedom for longitudinal displacement.

2. A mechanism as described in claim 1, and in which an extension of the piston rod is formed with radial longitudinal bosses and the driven shaft is forked at its end to embrace and engage the piston rod, whereby the piston is rotated with capacity for longitudinal displacement.

WERNER FLEURY.